United States Patent [19]

Lisch

[11] Patent Number: 5,542,206
[45] Date of Patent: Aug. 6, 1996

[54] LURE AND TACKLE STACKING CONTAINER

[76] Inventor: Albert Lisch, 160 Kaluamoo St., Kailua, Hi. 96734

[21] Appl. No.: 320,699

[22] Filed: Oct. 11, 1994

[51] Int. Cl.$^6$ .............................. A01K 97/06; B65D 6/00
[52] U.S. Cl. ...................... 43/54.1; 43/57.1; 206/315.11; 224/920; 220/4.27
[58] Field of Search ................................. 43/54.1, 57.1, 43/55, 57.2; 206/315.11, 519; 224/920; 220/4.27

[56] References Cited

U.S. PATENT DOCUMENTS

| | | | |
|---|---|---|---|
| 908,338 | 12/1908 | Sheble et al. | 43/57.1 |
| 3,039,226 | 6/1962 | Bagdonas | 43/57.2 |
| 3,369,691 | 2/1968 | Wei | 220/4.27 |
| 4,200,249 | 4/1980 | Synstelien et al. | 242/396.5 |
| 4,700,502 | 10/1987 | McFarland et al. | 206/315.11 |
| 5,386,922 | 2/1995 | Jordan | 220/4.27 X |

*Primary Examiner*—Jeanne M. Elpel
*Attorney, Agent, or Firm*—Michael I. Kroll

[57] ABSTRACT

A lure and tackle stacking container comprising a plurality of independent trays, in which each tray can hold lures and tackle therein. A structure is in each tray, for stacking the trays one upon the other. An assembly is in each tray for interlocking and unlocking the trays when the trays are stacked one upon the other. A cover fits upon the uppermost tray. A facility is in the cover for interlocking and unlocking the cover to the uppermost tray.

8 Claims, 3 Drawing Sheets

LURE AND TACKLE STACKING CONTAINER

BACKGROUND OF THE INVENTION

1. Field of the Invention

The instant invention relates generally to fishing tackle boxes and more specifically it relates to a lure and tackle stacking container.

2. Description of the Prior Art

Numerous fishing tackle boxes have been provided in prior art. For example, U.S. Pat. Nos. 4,067,607 to Battles; 4,474,291 to Fortson; 4,782,619 to Richards and 4,827,658 to Wolniak all are illustrative of such prior art. While these units may be suitable for the particular purpose to which they address, they would not be as suitable for the purposes of the present invention as heretofore described.

U.S. Pat. No. 4,067,607

An upright cylindrical housing having closed ends is provided with a wall diametrically and longitudinally divided intermediate its ends to define a stationary wall portion and a movable wall portion. The movable wall portion forms a door slideably disposed in circular tracks formed by the respective end of the housing to cover and uncover an access opening formed by the divided wall. The housing is transversely divided by a plurality of partitions arranged in vertically spaced relation to form a plurality of compartments. Each of the partitions rotatably support a circular upwardly open fishing tackle receiving tray with each of the trays being movable outwardly through the access opening with respect to its supporting partition by a radial slot formed in the respective partition.

U.S. Pat. No. 4,474,291

A tackle box with a plurality of independently pivotal trays oriented in a tiered arrangement and provided with a side closure for each side of the box. In one embodiment, the tackle box housing includes a bottom member, a pair of end members upstanding from the bottom member connected by connecting walls to form a U-shaped structure, a generally U-shaped flanged end receiver coupling pairs of the end members, a top support channel bridging the tackle box housing and supported at its ends by a top support adapter connected to the U-shaped end receiver, a carrying handle on the top support channel, a central divider secured to the bottom member and fastened to the top support channel and handle, a series of bait trays having opposite ends pivoted to the end member and a side cover assembly including a guide bar and an interlocking lip disposed to be received within an adjacent space. When in its extended position, the side cover assembly extends as a cover peripherally of the tackle box housing and has a series of snap buttons at the lower edge thereof for engaging a snap button arrangement on a hingedly provided side door thereby completing respective closure coverings for the tackle box. In another embodiment, an articulated hinged side cover is provided to fold back and allow access to the trays in the tackle box, thereby greatly simplifying the structure.

U.S. Pat. No. 4,782,619

A modular fishing tackle box includes a box portion, a lid, and a plurality of modular members detachably securable beneath the box portion and to each other. The modular members can each include one or more transversely slideable drawers for containing fishing tackle or the like, accessible without detachment of the modular members from the box portion. Alternatively, the modular members can themselves be dimensioned to receive tackle therein, and moved with respect to the box portion or associated members, so as to expose the fishing tackle for use. The modular members are connected to the box portion or each other by a pair of spaced slideable tongue and groove joints on the top and bottom of each member, and the bottom of the box portion. The joints are each formed as a pair of L-shaped flanges. The fishing tackle box is constructed throughout from an inert, molded plastic material, resistant to rusting and corrosion, especially from salt water.

U.S. Pat. No. 4,827,658

A fishing tackle box having a plurality of vertically disposed storage compartments or tubes for containing various size fishing lures. The vertically disposed tubes are formed from transparent plastic and positioned in the tackle box with a portion thereof extending upwardly from the base portion of the tackle box to permit the lures carried within the vertically disposed storage compartments or tubes to be readily seen for facilitating lure selection.

SUMMARY OF THE INVENTION

A primary object of the present invention is to provide a lure and tackle stacking container that will overcome the shortcomings of the prior art devices.

Another object is to provide a lure and tackle stacking container in a cylindrical configuration that contains a locking cover with a carry handle and interlocking independent trays for storing lures and tackle therein.

An additional object is to provide a lure and tackle stacking container, in which the size of the container can be varied depending upon the amount of trays utilized when being stacked upon each other.

A further object is to provide a lure and tackle stacking container that is simple and easy to use.

A still further object is to provide a lure and tackle stacking container that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
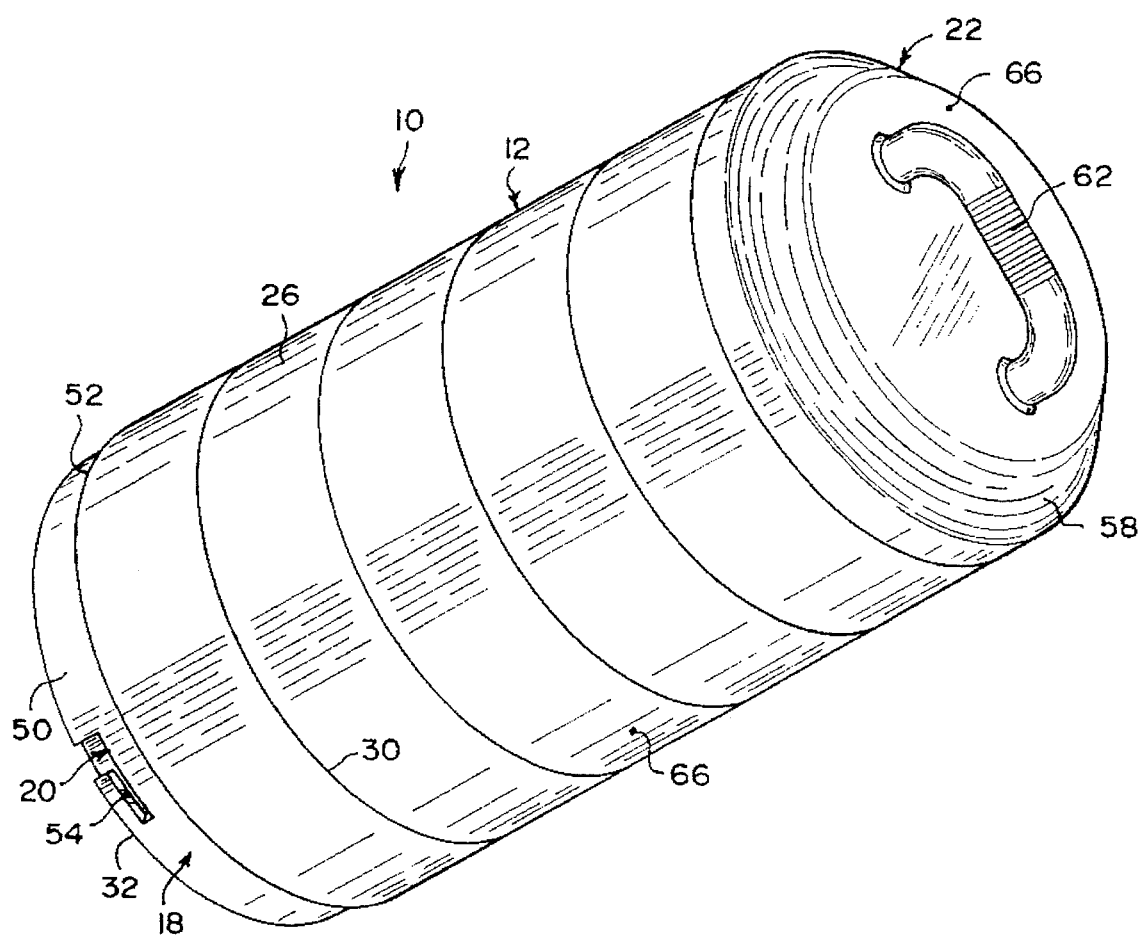
FIG. 1 is a top perspective view of the instant invention assembled.
Figure 2:
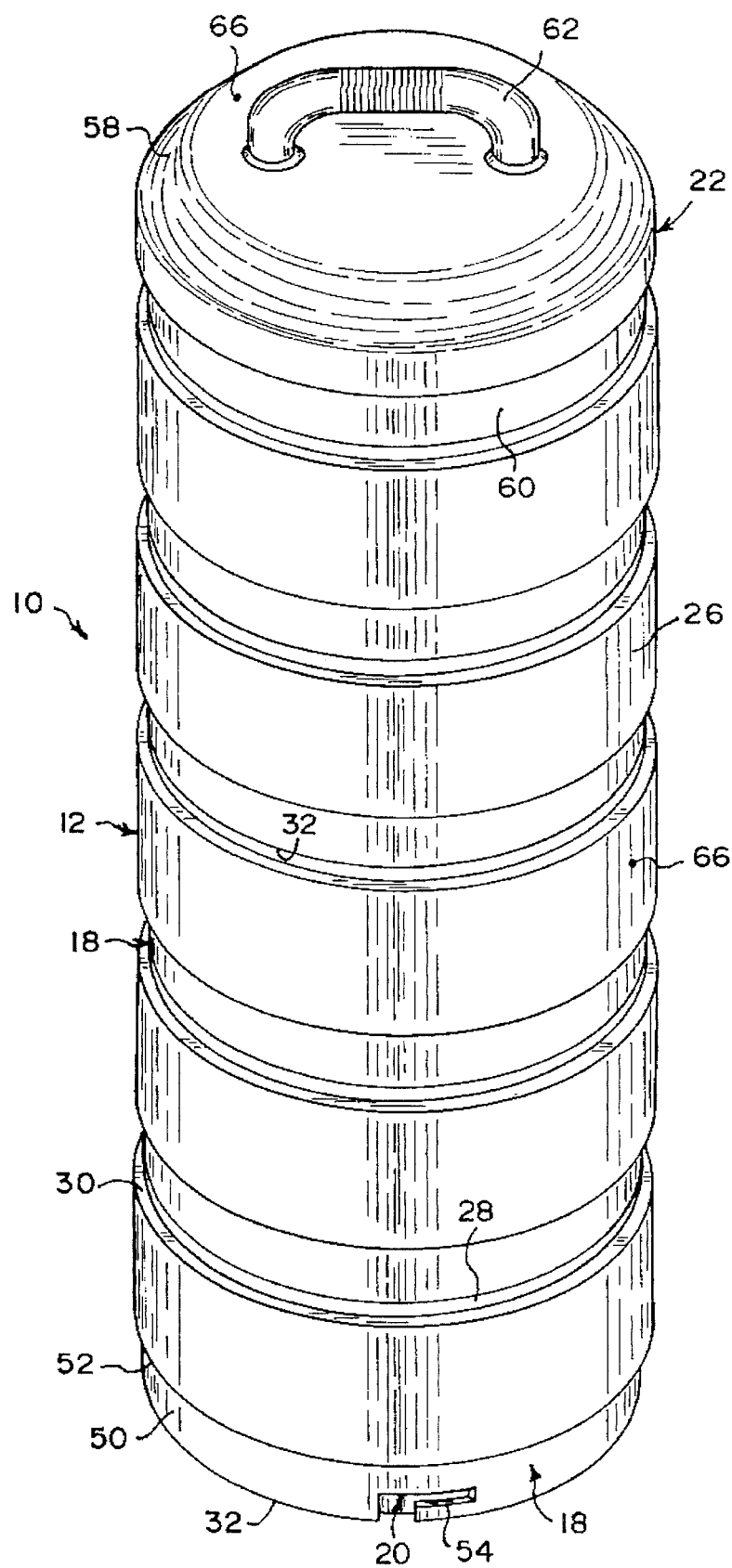
FIG. 2 is a top perspective view of the instant invention partially disassembled.
Figure 3:
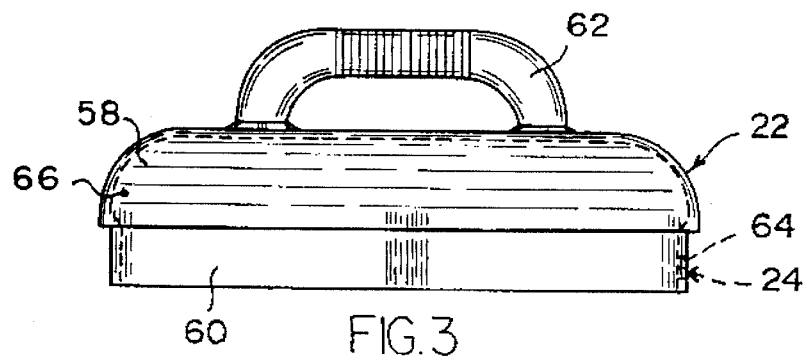
FIG. 3 is a side view of the cover.
Figure 4:
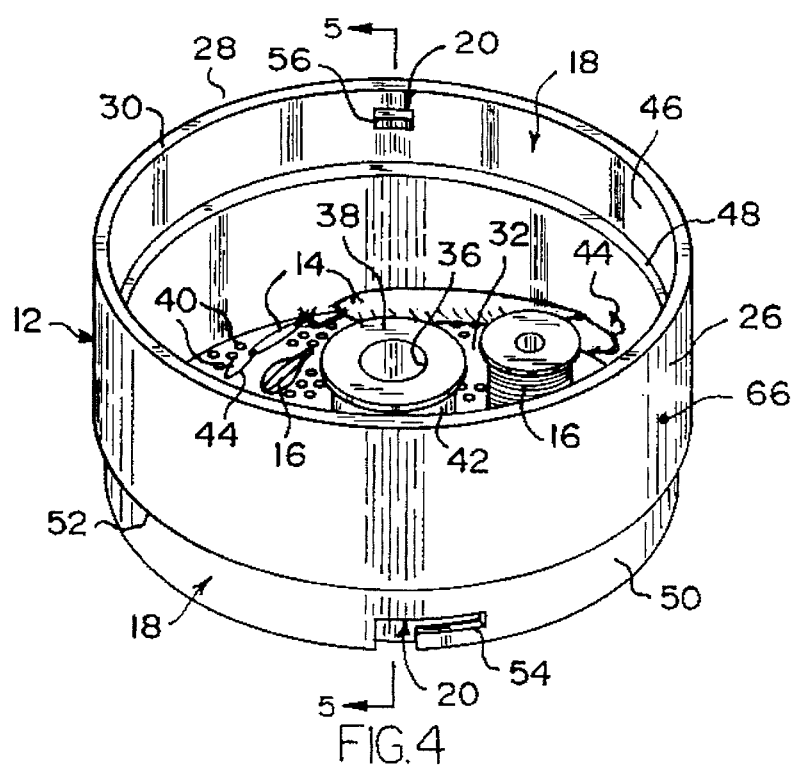
FIG. 4 is a top perspective view of one of the trays showing lures and tackle stored therein.

Turning now descriptively to the drawings, in which similar reference characters denote similar elements throughout the several views, FIGS. 1 through 5 illustrate a lure and tackle stacking container 10 comprising a plurality of independent trays 12, in which each tray 12 can hold lures 14 and tackle 16 therein. A structure 18 is in each tray 12, for stacking the trays 12 one upon the other. An assembly 20 is in each tray 12 for interlocking and unlocking the trays 12 when the trays 12 are stacked one upon the other. A cover 22 fits upon the uppermost trays 12. A facility 24 is in the cover 22, for interlocking and unlocking the cover 22 to the uppermost tray 12.

Figure 5:
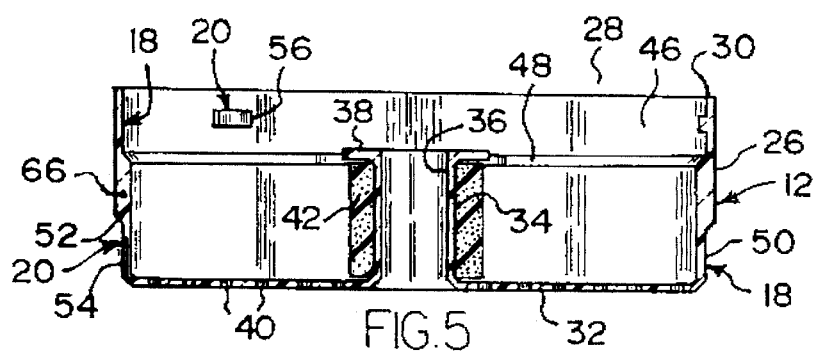
FIG. 5 is a cross sectional view taken along line 5—5 in FIG. 4, with the lures and tackle removed therefrom.

Each tray 12 includes a cylindrical side wall 26 having an open top 28 with an annular rim 30 thereabout, and a disc-shaped bottom wall 32. An upstanding central barrel 34, as best seen in FIG. 5, is formed on the bottom wall 32. The barrel 34 has a finger hole 36 therethrough. An annular top flange 38 is formed on the barrel 34. A person can insert a finger into the finger hole 36 and grip the flange 38 to lift and carry the tray 12.

The bottom wall 32 is perforated at 40, to allow water drainage therethrough. A foam rubber sleeve 42 fits over the barrel 34 and under the flange 38. Hooks 44 on the lures 16 can be inserted into the sleeve 42 for safety reasons.

Each tray stacking structure 18 contains an upper inner setback face 46, with an inner annular seat 48 on the side wall 26 directly below the rim 30. A lower outer setback face 50 with an outer annular seat 52 is on the side wall 26 directly above the bottom wall 32. When two of the trays 12 are stacked together, the lower outer setback face 50 of the upper tray 12 will fit into the open top 28 of the lower tray 12. The outer annular seat 52 of the upper tray 12 will nest on the rim 30 of the lower tray 12. The bottom wall 32 of the upper tray 12 will nest on the inner annular seat 48 of the lower tray 12.

Each tray interlocking and unlocking assembly 20, consists of the lower outer setback face 50 on the side wall 26 having an L-shaped lock slot 54. The upper inner setback face 46 on the side wall 26 has a lock button 56. When two of the trays 12 are stacked together and the lower outer setback face 50 of the upper tray 12 fits into the open top 28 of the lower tray 12, the lock button 56 will engage with the lock slot 54 when the upper tray 12 is slightly turned in one direction. The lock button 56 will disengage from the lock slot 54, when the upper tray 12 is slightly turned in an opposite direction.

The cover 22 includes a dome-shaped lid 58. A collar 60 extends downwardly from the lid 58 to fit into the open top 28 of the uppermost tray 12. A C-shaped carry handle 62 is affixed to the top of the lid 58 to be carried by a person.

The cover interlocking and unlocking facility 24 consists of the collar 60 having an L-shaped lock slot 64. When the collar 60 fits into the open top 28 of the uppermost tray 12, the lock button 56 in the uppermost tray 12 will engage with the lock slot 64 in the collar 60, when the cover 22 is slightly turned in one direction. The lock button 56 will disengage from the lock slot 64 when the cover 22 is slightly turned in an opposite direction.

The trays 12 and the cover 22 are fabricated out of molded plastic material 66. The molded plastic material 66 can be transparent, as shown in FIG. 5, to allow a person to look into each tray 12 and see the lures 14 and tackle 16 therein.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A lure and tackle stacking container comprising:
   a) a plurality of independent trays, in which each said tray can hold lures and tackle therein, wherein each said tray includes a cylindrical side wall having an open top with an annular rim thereabout, a disc-shaped bottom wall, an upstanding central barrel formed on said bottom wall, in which said barrel has a finger hole therethrough, and an annular top flange formed on said barrel, so that a person can insert a finger into said finger hole and grip said flange to lift and carry said tray, wherein said bottom wall is perforated to allow water drainage therethrough, said tray further including a foam rubber sleeve to fit over said barrel and under said flange, so that hooks on the lures can be inserted into said sleeve for safety reasons;
   b) means in each said tray, for stacking said trays one upon the other;
   c) means in each said tray for interlocking and unlocking said trays when said trays are stacked one upon the other;
   d) a cover to fit upon said uppermost tray; and
   e) means in said cover for interlocking and unlocking said cover to said uppermost tray.

2. A lure and tackle stacking container as recited in claim 1, wherein each said tray stacking means includes:
   a) an upper inner setback face with an inner annular seat on said side wall directly below said rim; and
   b) a lower outer setback face with an outer annular seat on said side wall directly above said bottom wall, so that when two of said trays are stacked together, said lower outer setback face of said upper tray will fit into said open top of said lower tray, with said outer annular seat of said upper tray nesting on said rim of said lower tray and said bottom wall of said upper tray nesting on said inner annular seat of said lower tray.

3. A lure and tackle stacking container as recited in claim 2, wherein each said tray interlocking and unlocking means includes:
   a) said lower outer setback face on said side wall having an L-shaped lock slot; and
   b) said upper inner setback face on said side wall having a lock button, so that when two of said trays are stacked together and said lower outer setback face of said upper tray fits into said open top of said lower tray, said lock button will engage with said lock slot when said upper tray is slightly turned in one direction and said lock button will disengage from said lock slot, when said upper tray is slightly turned in an opposite direction.

4. A lure and tackle stacking container as recited in claim 3, wherein said cover includes:

a) a dome-shaped lid; and b) a collar extending downwardly from said lid to fit into said open top of said uppermost tray.

5. A lure and tackle stacking container as recited in claim 4, wherein said cover further includes a C-shaped carry handle affixed to the top of said lid to be carried by a person.

6. A lure and tackle stacking container s recited in claim 5, wherein said cover interlocking and unlocking means includes said collar having an L-shaped lock slot, so that when said collar fits into said open top of said uppermost tray, said lock button in said uppermost tray will engage with said lock slot in said collar when said cover is slightly turned in one direction and said lock button will disengage from said lock slot when said cover is slightly turned in an opposite direction.

7. A lure and tackle stacking container as recited in claim 6, wherein said trays and said cover are fabricated out of molded plastic material.

8. A lure and tackle stacking container as recited in claim 7, wherein said molded plastic material can be transparent to allow a person to look into each said tray and see the lures and tackle therein.

* * * * *